United States Patent [19]

Cyran et al.

[11] Patent Number: 4,555,391

[45] Date of Patent: Nov. 26, 1985

[54] DRY INJECTION FLUE GAS DESULFURIZATION PROCESS

[75] Inventors: Michael J. Cyran, Morrisville, Pa.; Kuei-Hsiung Wang, Arlington Heights, Ill.

[73] Assignee: Intermountain Research & Development Corporation, Green River, Wyo.

[21] Appl. No.: 634,234

[22] Filed: Jul. 24, 1984

[51] Int. Cl.$^4$ ............................ B01J 8/00; C01B 17/00
[52] U.S. Cl. ...................................... 423/244; 423/242
[58] Field of Search .......... 423/242 A, 244 A, 244 R, 423/242 R

[56] References Cited

U.S. PATENT DOCUMENTS

| | | | |
|---|---|---|---|
| 3,852,410 | 12/1974 | Rivers et al. | 423/244 |
| 3,880,629 | 4/1975 | Dulin et al. | 423/244 |
| 4,018,868 | 4/1977 | Knight | 423/244 |
| 4,061,476 | 12/1977 | Holter et al. | |
| 4,197,278 | 4/1980 | Gehri et al. | 423/242 |
| 4,324,770 | 4/1982 | Bakke | 423/242 |

OTHER PUBLICATIONS

L. J. Muzio et al, "22 MW Coal-Fired Demonstration of Dry SO$_2$ Scrubbing with Sodium Sorbent Compounds", Second EPRI Conference on Fabric Filter Technology for Coal-Fired Power Plants, Denver, Colo., (Mar. 1983).

*Primary Examiner*—Gregory A. Heller
*Attorney, Agent, or Firm*—C. Egolf

[57] ABSTRACT

YUtilization of a soda-type dry sorbent in a dry injection flue gas desulfurization process is increased, without sacrifice in the SO$_2$ removal efficiency, by reinjecting a portion of the sorbent collected in the baghouse filter back into the hot flue gas stream along with fresh sorbent; the recycled sorbent is optionally cooled below the bag filter temperature prior to its reinjection.

23 Claims, 1 Drawing Figure

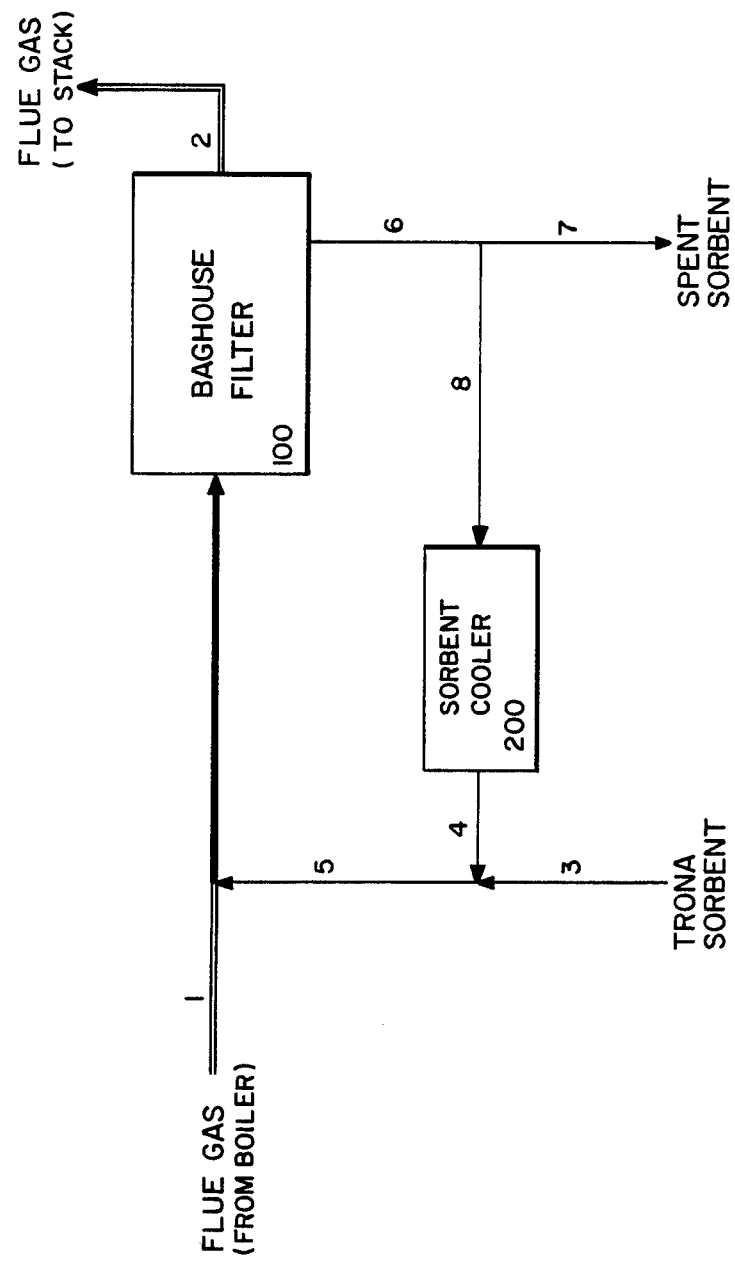

DRY INJECTION FLUE GAS DESULFURIZATION PROCESS

BACKGROUND OF THE INVENTION

1. Field of the Invention

This invention relates to the removal of sulfur oxides from flue gas streams by injecting a soda-type dry sorbent such as trona or nahcolite into the gas stream and collecting the sorbent in a bag filter.

2. Description of the Prior Art

Dry sorbent injection is receiving increased attention as a method for removing sulfur oxides from the stack gases of coal-fired utility and industrial plants, especially those using low sulfur coals. Flue gas desulfurization (FGD) systems in commercial use are generally based on wet scrubbing or spray drying processes. Evaluations of dry sorbent injection, however, have revealed its advantages of operational simplicity and reliability, attractive equipment and labor costs, and lower water consumption, over the present conventional FGD systems.

In dry sorbent injection, a suitable sorbent is injected as a dry powder into a $SO_2$-containing flue gas stream and is then collected, along with fly ash in the hot flue gas stream, in a fabric filter baghouse.

Sulfur dioxide in the hot flue gas stream reacts with the injected sorbent, while the latter is fluidized in the ductwork and also when the flue gas passes through the baghouse filter cake. The baghouse filter cake, a mixture of fly ash and sorbent-$SO_2$ reaction product, is periodically removed for disposal.

Sodium compounds are currently favored as dry injection sorbent candidates, with nahcolite (crude sodium bicarbonate), trona (crude sodium sesquicarbonate), and absorptive soda ash (commercial sodium carbonate) being mentioned as suitable soda-type sorbents.

The performance of these soda-type sorbents is generally measured by two criteria:

(i) sulfur dioxide removal efficiency—the requirement that a specified percentage, e.g., 70% or 90%, of the $SO_2$ content in the $SO_2$-containing flue gas stream be removed by FGD treatment with sorbent; $SO_2$ removal efficiency is readily calculated as $$\frac{\text{Amount } SO_2 \text{ removed from flue gas}}{\text{Amount } SO_2 \text{ in inlet flue gas}} \times 100$$

(ii) sodium utilization—the percentage of available sodium in the dry sorbent which is reacted with sulfur dioxide during the FGD process; "sodium utilization," sometimes referred to as "sodium efficiency," may be calculated as $$\frac{\text{Amount } Na_2 \text{ reacted with } SO_2 \times 100}{\text{Amount } Na_2 \text{ present in injected sorbent}}$$

A third parameter related to these two performance criteria is the "normalized stoichiometric ratio" (NSR), a measure of the overall reaction stoichiometry during the FGD treatment process. Normalized stoichiometric ratio may be calculated as $$\frac{SO_2 \text{ Removal Efficiency, \%}}{\text{Sodium Utilization, \%}}$$

A NSR=1 for a flue gas desulfurization treatment indicates that for every one mole of sulfur dioxide present in the flue gas stream being treated, there is also present one mole of available sodium ($Na_2$) in the sorbent.

A desirable sorbent is one in which the percentage of $SO_2$ removed from the flue gas stream is maximized, e.g., $SO_2$ removal efficiency $=90+\%$, while the sorbent is fully utilized during the desulfurization treatment process, i.e., substantially all available sodium is reacted.

In recent full-scale dry-injection FGD tests involving nahcolite, trona and soda ash as the dry sorbents, nahcolite was reported to be superior to trona in $SO_2$ removal at comparable NSR's, and soda ash was found to be ineffective in removing $SO_2$. With nahcolite as the preferred dry sorbent, a steadystate $SO_2$ removal efficiency of 81% was achieved with a NSR=1.0 (corresponding to a sodium utilization of 81%); see L. J. Muzio et al., "22MW Coal-Fired Demonstration of Dry $SO_2$ Scrubbing With Sodium Sorbent Compounds," presented at Second EPRI Conference on Fabric Filter Technology for Coal-Fired Power Plants held in Denver on Mar. 22-24, 1983.

Most research to date on dry injection FGD appears to have centered on fundamental investigations of sorbent types and injection rate and FGD temperature conditions for their impact on $SO_2$ removal. As a consequence, few references describe dry injection FGD procedures and sorbents in sufficient detail to develop a process suitable for commercial use. No references have been found that provide methods for improving overall sorbent efficiency in a full-scale dry-injection FGD process.

Such improvements are reported for other FGD processes (not dry injection) that have undergone more substantial commercial development. A spray-drying process described in U.S. Pat. No. 4,324,770 issued to Bakke obtains an improvement in $SO_2$-removal efficiency and alkali (lime) reagent utilization by recycle of the spray-dried powder into the spray dryer. Drawbacks to this process are that large amounts of recycle are called for and, like other spray-drying FGD procedures, that large amounts of energy are consumed in the evaporation of water in the spray drying operation and a dependable water source is required.

The present invention, however, concerns a dry injection FGD process and utilizes a novel recycle procedure that unexpectedly increases the sodium utilization of soda-type dry injection sorbents, without compromising the $SO_2$ removal efficiency desired for the process.

SUMMARY OF THE INVENTION

In accordance with the present invention, a $SO_2$-containing flue gas stream is desulfurized in a dry injection process with a soda-type dry sorbent by the steps of injecting a soda-type particulate dry sorbent into a hot flue gas stream containing sulfur oxide to desulfurize the gas stream;

collecting the dry sorbent in a bag filter;

removing the collected dry sorbent from the bag filter;

recycling a portion of the removed sorbent for reinjection into the flue gas stream; and reinjecting the recycled sorbent into the hot flue gas stream at a ratio of from about 0.2:1 to 5:1 reinjected sorbent : fresh injected sorbent, based on their respective sodium contents.

In another embodiment of this invention, the recycled sorbent is cooled below the bag filter temperature, prior to its reinjection, to a lower temperature at which the sodium utilization of the sorbent is enhanced; such temperature is preferably below 90° C. and more preferably below 70° C.

The soda-type sorbent employed in this invention is preferably selected from sodium bicarbonate, Wegscheider's salt, sodium sesquicarbonate, and absorptive soda ash.

Sufficient sorbent is desirably injected into the hot flue gas stream to remove at least 70%, and more desirably at least 90% of the sulfur dioxide from the gas stream.

The recycle ratio utilized in the process of this invention is desirably adjusted so as to provide a sodium utilization in the dry sorbent of at least 70%, and more desirably at least 85%, based on available sodium in the fresh sorbent feed.

BRIEF DESCRIPTION OF THE DRAWING

The drawing is a block flow diagram that illustrates the recycle dry injection FGD process in one embodiment of this invention in which trona is used as the sorbent to achieve a $SO_2$ removal efficiency of 90%.

DETAILED DESCRIPTION

The dry injection process of this invention is designed to provide improved, superior desulfurization performance from soda-type sorbents whose flue gas desulfurization (FGD) efficiency ordinarily would be characterized as mediocre. The process improvement defined by this invention is intended to be integrated into a conventional dry injection FGD scheme, without significant additional capital outlays or equipment modification.

A dry injection FGD process typically involves injection of the dry sorbent into a $SO_2$-containing flue gas stream, upstream of the point where a baghouse fabric filter is located for removing entrained fly ash from the hot gas stream. The dry sorbent that is injected into the ductwork carrying the hot flue gas stream is collected in the baghouse filter along with fly ash.

The baghouse filter ordinarily operates on a cyclic basis, with entrained solids in the hot gas stream being collected as a hot filter cake in the fabric filter over a period of time, e.g., 0.25 hour to 3 hours. At the end of the collection period, the collected hot solids are removed from the filter, and the filtration cycle is then repeated. Because the fabric filter baghouse is typically designed with multiple bag units, the gas stream at all times continues to be filtered by filters in active use, while some of the bag units have their collected solids removed.

Past investigators researching the use of soda-type dry sorbents in dry injection FGD processes have indicated that absorption of $SO_2$ from the gas stream (occurring both while the sorbent is fluidized in the gas stream and while deposited in the collected bag filter cake) appears to result in the progressive decline in the sorbent's $SO_2$ removal efficiency. L. J. Muzio et al. in their previously-mentioned EPRI Report, "22MW Coal-Fired Demonstration of Dry $SO_2$ Scrubbing with Sodium Sorbent Compounds," speculate that the factor limiting the ultimate utilization of sodium in the dry sorbent is pore plugging and a barrier layer of reaction product, $Na_2SO_4$, through which $SO_2$ must diffuse in order to react with unreacted sodium (carbonate) in the sorbent.

The present inventors have unexpectedly discovered that this hypothesized sorption/reaction mechanism is *not* an impediment to increasing utilization of sodium with a soda-type dry sorbent. It has been found that sodium utilization in a soda-type dry sorbent, which typically is removed from the bag filter after completion of the filter cycle and simply discarded or otherwise disposed of, may be significantly increased by recycling a portion such sorbent, for reinjection into the flue gas stream, optionally with the recycled sorbent being cooled prior to its reinjection.

The overall sodium utilization of the dry sorbent is markedly increased according to this invention, by recycling a portion of the "spent" or "used" sorbent removed from the bag filter and reinjecting it into the flue gas stream. The ratio of reinjected sorbent: fresh sorbent should be from about 0.2:1 to 5:1, preferably from 0.5:1 to 3:1, and most preferably from 1:1 to 3:1, all ratio ranges being based on the respective amounts of sodium (as Na) present in the reinjected and fresh sorbent. Determination of the recycle on a sodium (Na) basis avoids any problems associated with the fact that a variety of sodium compounds may be present in the fresh sorbent (e.g., sodium bicarbonate, sodium carbonate, sodium sesquicarbonate) and in the recycled sorbent (e.g., sodium sulfite, sodium sulfate).

The reinjected recycled sorbent may be introduced into the hot flue gas stream in any of several ways, with respect to the fresh sorbent that is also injected. Fresh sorbent and recycled sorbent may be mixed together and then injected as a single feed, or separate streams of fresh sorbent and recycled sorbent may be injected concurrently or not. Introduction of the one or both of the recycled and fresh sorbent feed streams may be continuous or intermittent.

With regard to the mode of fresh sorbent injection and recycled sorbent reinjection, the sole requirement is that the time-averaged or overall addition rate of the fresh and reinjected sorbent fall within the ratio ranges noted above.

In another embodiment of the recycle procedure of this invention, the recycled sorbent is cooled below the baghouse filter temperature, prior to its reinjection, to a lower temperature at which the sodium utilization efficiency of the sorbent is enhanced. Baghouse filter temperature may conveniently be measured as the flue gas stream temperature upon leaving the filter; the solid cake collected in the baghouse filter is ordinarily at a temperature close to that of the flue gas stream passing through the cake. When fresh or recycled sorbent is injected into the hot flue gas stream it becomes heated in a relatively short time to a temperature close to that of the flue gas stream.

Flue gas streams from utility boiler operations normally are at a temperature within the range of 100°-250° C. when the flue gas stream is introduced to the baghouse filter. It should be noted that this invention does not call for any special heating or cooling of the flue gas stream, either prior to its introduction to the baghouse filters or in conjunction with the injection of the dry sorbent into the flue gas stream for FGD.

The dry sorbent being recycled with cooling in the method of this invention is preferably cooled below temperature of about 90° C., particularly when the sorbent is sodium sesquicarbonate. The recycled sorbent is more preferably cooled below a temperature of about 70° C., particularly when the sorbent is trona ore.

Regardless of the particular soda-type sorbent being utilized, it is most preferred that the recycled sorbent be cooled below a temperature of about 50°. No advantage is seen in cooling the recycled sorbent below about 15°–25° C., i.e. ambient temperature.

The recycled sorbent is desirably maintained at the cooler temperature for at least five minutes, and preferably at least fifteen minutes, before being reinjected. This is readily accomplished when the cooled sorbent is deposited in a storage bin or hopper prior to its being reinjected.

The cooling of the recycled sorbent may be carried out in various ways. In one embodiment, cooling may be effected by first removing the sorbent from the bag filter after completion of the filter cycle and then cooling the portion of the sorbent being recycled.

An alternative procedure involves cooling the sorbent in situ, while still in the bag filter after completion of the filter cycle. After flow of the hot flue gas through the sorbent is ceased, the sorbent is then cooled by passage of cool air or other gas through the filter cake, until the desired temperature requirement for cooling is satisfied. The cooled sorbent can then be removed from the baghouse and the desired proportion of sorbent recycled for reinjection into the hot flue gas stream.

When the sorbent is cooled in situ, as just described, it should be evident that recycle of the "regenerated" sorbent by physically removing it and reinjecting it into the flue gas stream is not absolutely necessary. The in situ-cooled sorbent may simply be recontacted with the hot flue gas (in essence recycling the sorbent), while the sorbent still lies in the bag filter-collected cake, to again absorb and react with $SO_2$ in the flue gas stream. Multiple cycles of desulfurization/cooling in this fashion may be carried out either prior to physical recycle or without physically recycling the sorbent.

A drawback to this mode of operation is that injected sorbent and entrained fly ash continue to be collected in the baghouse filters during desulfurization and must eventually be removed from the bag filter to avoid the accumulation of an excessively thick cake on the filter, with concurrent deterioration in filter performance. Actual physical recycling and reinjection of a portion of the sorbent is therefore preferred to permit removal of the non-recycled sorbent, and this may be done either with or without multiple desulfurization/cooling cycles in situ.

The means for carrying out the desired cooling of the sorbent may include use of cooling air, or other cool gas stream, that is contacted directly with the hot sorbent. Large volumes of the gaseous cooling medium are ordinarily required because of its limited heat capacity. The gaseous cooling medium is preferably air, and such air may contain moisture in the usual amounts present for ambient air.

Indirect cooling of the sorbent is preferred, by conveying the recycled sorbent through a heat exchanger which is equipped with cooling surfaces (fins, coils) and which uses a cooling fluid to lower the temperature of the hot sorbent. Double pipe heat exchangers are preferred, with circulating cold water providing the necessary cooling.

The hot sorbent removed from the baghouse filters for recycle is normally conveyed pneumatically with air and then stored in a bin or hopper, before being reinjected into the flue gas stream along with fresh sorbent.

When the recycled sorbent is to be cooled prior to its reinjection, the cooling device is typically located upstream of the storage hopper.

The dry injection sorbent utilized in the process of this invention is a soda-type compound, containing $NaHCO_3$ and/or $Na_2CO_3$. The soda-type compound may be in the form of a natural ore, or a compound refined from an ore source, or a synthetically-prepared compound. Mixtures of the soda-type compounds may also be used.

Suitable soda-type sorbents include sodium bicarbonate ($NaHCO_3$); Wegscheider's salt ($Na_2CO_3.3NaHCO_3$); sodium sesquicarbonate ($Na_2CO_3.NaHCO_3.2H_2O$); absorptive soda ash or sodium carbonate ($Na_2CO_3$), regardless of its source or preparation method. The natural ores of these compounds, particularly nahcolite (crude sodium bicarbonate) and trona (crude sodium sesquicarbonate), are especially preferred as dry sorbents, since high purity of the soda-type compound is not critical to its satisfactory performance as an FGD sorbent. References to a sodatype compound (such as sodium sesquicarbonate) in this disclosure should be construed as including its natural ore (e.g., trona).

In short, any soda-type dry sorbent that has at least a marginal capacity for flue gas desulfurization, i.e., capable of absorbing/reacting as a particulte solid with sulfur oxides, can be used. Soda-type dry sorbents that exhibit average FGD performance, i.e., having one-pass sodium utilizations of about 40–60% (for an NSR $\cong 1$), are particularly well suited for use in this invention, because of the remarkable improvement in sodium utilization that is realized.

Trona and crude sodium bicarbonate (e.g., nahcolite) are preferred for use in this invention, as mentioned above. These materials may also be pre-calcined, to yield an absorptive, crude soda ash, prior to their being utilized as sorbents for dry injection FGD.

The dry sorbent must be in particulate or powdered form, so as to facilitate its injection and fluidization in the flue gas stream. The soda-type sorbent is preferably of a particle sizing that is substantially all smaller than 40 mesh sieve, and more preferably substantially all smaller than 100 mesh sieve. The particulate sorbent preferably has an average particle size that lies between 100 mesh sieve and about 400 mesh sieve and, more preferably, between 140 mesh sieve and 325 mesh sieve.

The recycled dry sorbent may optionally be crushed, to expose more surface area available for desulfurization, but this step is not necessary in the recycle process of the present invention.

The fabric filter baghouse facility utilized in the process of this invention is one that is conventionally employed for removal of fly ash from flue gas streams from coal-fired utility or industrial boilers. The operating parameters for these conventional baghouse facilities are generally applicable to the present invention.

The baghouse filter collection cycle is ordinarily a period within the range of from about 15 minutes to about 3 hours long (under normal operating conditions), after which time the collected dust and particulates are removed, e.g., by shaking or rapping the bag filters. Longer collection periods, e.g., up to 6 hours, are feasible albeit with some loss in filtration efficiency. Such longer collection periods are typically used when the baghouse is operated with less then the design capacity gas flow rate.

The temperature in the baghouse filter is desirably maintained in the range of from about 100° C. to about 250° C., more preferably, from 100° C. to 175° C. These preferred temperatures are ordinarily obtained by the passage of the hot flue gas stream through the baghouse filter, and, as mentioned previously, no special heating or cooling of the flue gas stream is required in the process of this invention.

One effect of the recycle process of this invention is that the collected cake in the bag filter will be thicker, as compared with no recycled material being introduced during the collection cycle. Bag filtration efficiencies ordinarily will not decrease substantially, despite the thicker cake collected on the filter during the collection cycle.

In some utility boiler operations, fly ash and other particulates are captured and removed via electrostatic precipitators instead of a fabric filter baghouse. The process of this invention is equally applicable to such operations. Throughout this disclosure, references to fabric filter baghouses in the context of the invention should be understood to include electrostatic precipitators as an equivalent means for collecting the injected sorbent.

The dry sorbent injection FGD process of this invention is particularly suited for use with low sulfur coals, preferably coal containing not more than 2 wt % sulfur. The gas obtained from burning such low-sulfur coal in a utility plant typically contains not more than about 0.4 wt % $SO_2$. Present environmental pollution regulations require that at least 70% of such sulfur dioxide (for coal containing up to 1.3 wt % S) be removed before the flue gas stream is released into the atmosphere.

The degree of increased utilization of the soda-type dry sorbent, in the method of this invention, is most dramatic when sulfur dioxide removal requirement is high, e.g. 80-90% or more $SO_2$ removal from the flue gas stream being desired, and when the single pass utilization of sodium in the sorbent is only fair, less than 65% of the sodium in the dry sorbent being reacted. The following Examples are illustrative.

EXAMPLES

Examples 1, 2 and 3 are simulations of full-scale utility operations employing the dry injection FGD recycle process of this invention and are based on data obtained from laboratory-scale work. Comparative Example A simulates a conventional dry injection FGD process for treating the flue gas stream from a utility boiler and is also based on data obtained from laboratory-scale work.

All Examples, including the Comparative Example, concern dry injection FGD processes that treat a $SO_2$-containing flue gas stream from a power plant, with uncalcined trona ore as the dry sorbent, to effect 90% removal of the sulfur dioxide. The fresh trona feed in all Examples is fixed at a constant rate, to provide for 100 lb/hr of sodium (Na) in the fresh feed.

Illustrating the method of this invention, Examples 1 and 3 employ a sorbent recycle ratio of 1:1, whereas Example 2 employs a 2:1 recycle ratio (all ratios based on sodium content). In Examples 1 and 2, moreover, the recycled sorbent is cooled to 25° C. prior to its reinjection into the hot flue gas stream. In Example 3 the sorbent is recycled without cooling. Comparative Example A, on the other hand, illustrates a conventional dry injection FGD process with no sorbent recycle.

EXAMPLE 1

Referring now to the drawing, a hot flue gas stream 1 from a utility boiler, at a temperature of about 130° C., is passed through a baghouse filter 100 and the particulate-free hot gas 2 is vented to the atmosphere through a stack. The flue gas stream 1 flows at a rate of about 90,000 lb/hr through duct work that yields a linear velocity for the gas stream in excess of 15 ft/sec.

The gas stream 1 contains entrained fly ash solids in an amount of about 1 wt % and is also contaminated with 870 ppm sulfur dioxide. Substantially all of the fly ash is removed in the baghouse filters. The baghouse 100 is a pulse jet type, with a cycle time of ninety minutes. Temperature of the hot gas passing through the baghouse remains relatively constant, at 130° C.

The sulfur dioxide level in Example 1, as in the other Examples, is reduced from 870 ppm in incoming gas stream 1 to 87 ppm in the exiting gas stream 2, a 90% removal efficiency.

Desulfurization is accomplished in Example 1 by injecting fresh trona sorbent 3, combined with recycled sorbent 4, into the flue gas stream 1; the ratio of fresh sorbent to recycled sorbent is adjusted to provide a 1:1 ratio based on the respective sodium (Na) contents.

The fresh trona feed 3 is a particulate material, all less than 140 mesh sieve in size, and is at ambient temperature, i.e., 25° C. The fresh trona 3 is introduced at a rate of 384 lb/hr (100 lb/hr Na basis). The trona contains 15 wt % insolubles, the balance being sodium sesquicarbonate ($Na_2CO_3 \cdot NaHCO_3 \cdot 2H_2O$)

The recycle stream 4, being recycled at a rate of 1320 lb/hr (100 lb/hr Na basis), is combined with the incoming fresh trona 3. The recycle:fresh feed ratio is therefore 1:1, based on their respective sodium (Na) contents.

A large portion of the recycle stream 4 is collected fly ash, amounting to 75 wt % of the recycled material. The remaining 25 wt % of recycle stream 4 is substantially all spent sorbent which consists of various sodium compounds: sodium carbonate, sodium bicarbonate, sodium sulfite, sodium sulfate, and a small amount of sodium chloride.

On a fly ash-free basis, the recycled material 4 has a sodium content that consists of 17 wt % $Na_2CO_3$, 2 wt % $NaHCO_3$, 55 wt % $Na_2SO_3$, 7 wt % $Na_2SO_4$ and less than 1 wt % $NaCl$.

The combined stream 5 of fresh trona feed 3 and recycled sorbent 4 is reinjected into the flue gas stream 1. Desulfurization of the hot gas stream 1 occurs while the injected sorbent is entrained in the flowing gas stream, for a few seconds, and also while the flue gas passes through the filter cake (collected fly ash and sorbent) in the baghouse filters during the ninety-minute collection cycle.

Upon completion of the baghouse filter cycle, the fly ash-sorbent cake that has accumulated in the bag filters is automatically removed as stream 6. The baghouse filter cake is removed at an average rate of 2640 lb/hr. One-half of the removed dry filter cake 6, containing both fly ash and spent sorbent, is disposed of, which is shown in the drawing as stream 7.

The other half of the dry cake 6, containing both fly ash and spent sorbent, is recycled, at a rate of 1320 lb/hr, and is shown in the drawing as stream 8. As mentioned above, the recycle stream 8 contains about 75 wt % fly ash. The remaining 25 wt % of the recycle material 8 contains various sodium compounds derived from the sorbent ($Na_2CO_3$, $NaHCO_3$), from the desulfuriation reactions with the sorbent ($Na_2SO_3$, $Na_2SO_4$), and from reaction of HCl in the gas stream (NaCl).

The recycled sorbent 8 is cooled, in the method of this Example 1, from a temperature of about 130° C. down to 50° C. This sorbent cooling is accomplished in a double pipe heat exchanger 200, through which the recycled sorbent 8 is pneumatically conveyed with air. The cooled recycled sorbent 4 is stored in a storage bin (not shown in the drawing) and is thereafter combined with fresh sorbent feed 3, as described above.

The dry injection sorbent recycle process of this Example 1, which removes 90% of the $SO_2$ from the incoming flue gas stream, results in a utilization of sorbent in the discarded sorbent stream 7 of 73%, i.e., 73% of the sodium available for reaction in the fresh trona feed 3 is in fact utilized in discarded stream 7. The normalized stoichiometric ratio (NSR) is therefore 1.23.

EXAMPLE 2

Example 2 is identical in most respects to Example 1, except that the recycle ratio of recycled spent sorbent: fresh feed is increased from 1:1 to 2:1. As described below, this increase in the recycle ratio results in greater sorbent efficiency, while still achieving the desired 90% $SO_2$ removal. Sorbent sodium utilization is improved to 77.5% (based on fresh trona feed), by the increase in recycle ratio in Example 2; NSR is therefore only 1.16.

Because of the increased recycle, the baghouse filter cake volume is larger than in the first Example and is removed at an average rate of 4140 lb/hr. One-third of this is discarded, and two-thirds is recycled, at a rate of 2760 lb/hr.

The composition of the recycled sorbent stream is slightly different from that of Example 1, since sorbent utilization is improved in this latter Example. The fly ash amounts to 76 wt % of the recycle stream. Using a fly ash-free basis, the remaining 24% of the recycle stream has the following sodium content: 14 wt % $Na_2CO_3$, 2 wt % $NaHCO_3$, 58 wt % $Na_2SO_3$, 7 wt % $Na_2SO_4$, and less than 1 wt % NaCl.

One other difference is that the flow-rate of flue gas stream is increased to 95,000 lb/hr in Example 2, as compared to 90,000 lb/hr in Example 1. This is necessary to ensure a consistent basis in all Examples of 384 lb/hr fresh trona feed (100 lb/hr Na basis) being used and of 90% of the sulfur dioxide being removed from the flue gas stream.

EXAMPLE 3

Example 3 utilizes the procedure of Example 1, with a 1:1 recycle ratio, except that no effort is made to cool the hot recycled material. Without any cooling of the recycled sorbent, Example 3 achieves 90% $SO_2$ removal with a sodium utilization of 65% for the sorbent (based on available sodium in fresh trona feed), as compared with 73% for Example 1; the NSR is therefore 1.38.

The flow rate of incoming flue gas in Example 3 is scaled back slightly, to about 80,000 lb/hr, to maintain the consistent basis in both Examples of 384 lb/hr fresh trona feed being used and of 90% of the sulfur oxide being removed from the flue gas stream.

The baghouse filter cake, corresponding to stream 6 in Example 1, is removed at an average rate of 2420 lb/hr. The fly ash content of the filter cake is 73 wt %. The remaining 27 wt % of the filter cake, the spent sorbent component, contains the following percentages of sodium compounds (all percentages on a fly ash-free basis): 23 wt % $Na_2CO_3$, 3 wt % $NaHCO_3$, 49 wt % $Na_2SO_3$, 6 wt % $Na_2SO_4$ and less than 1% NaCl.

The withdrawn filter cake is divided into two equal streams, one being discarded and the other being recycled.

The recycled stream, at a temperature of 130° C., is combined directly with the incoming fresh trona feed, without any cooling such as employed in Example 1. The combined hot recycle stream and fresh feed is then injected into the flue gas stream to continue the flue gas desulfurization process.

COMPARATIVE EXAMPLE A

Comparative Example A is a conventional dry injection FGD process in which there is no sorbent recycle. All of the fly ash/sorbent mixture collected in the baghouse filters is simply discarded, and as a result, sorbent efficiency is low for this one-pass dry injection process. In other respects, the process is operated in a manner similar to Examples 1-3.

As before, fresh trona feed is introduced into the flue gas stream at a rate of 384 lb/hr, to provide sodium at a rate of 100 lb Na/hr. Sizing and temperature of the trona are −140 mesh sieve and ambient, respectively, as in Examples 1-3.

The flue gas stream composition and temperature are unchanged. The $SO_2$ removal requirement is maintained at 90%, so that the $SO_2$ level of 870 ppm in the incoming flue gas is reduced to 87 ppm in the exiting gas. The flue gas stream flow rate is scaled back to about 74,000 lb/hr, since the fresh sorbent feed rate and the $SO_2$ removal target percentage are fixed at constant values in all Examples.

The sorbent/fly ash mixture is collected in the baghouse filter and is removed for disposal at an average rate of 1140 lb/hr. The fly ash content of the filter cake is 72 wt %. The spent sorbent component of the filter cake mixture contains the following sodium compounds in the amounts noted (all percentages on a fly ash-free basis): 26 wt % $Na_2CO_3$, 4 wt % $NaHCO_3$, 46 wt % $Na_2SO_3$, 6 wt % $Na_2SO_4$ and less than 1 wt % NaCl.

Without any recycle of the spent sorbent, the sorbent efficiency in Comparative Example A is low, sodium utilization being only 60%, in order to achieve 90 % $SO_2$ removal; the NSR is therefore 1.50.

The following summary of FGD performance of the trona sorbent in these Examples, all of which effect 90 % removal of $SO_2$, indicates the significant improvement in sorbent efficiency that results from the dry injection recycle process of this invention.

| Example | Recycle Ratio | Cooling of Recycle | Sodium Utilization* | NSR* |
|---|---|---|---|---|
| A | n/a | n/a | 60% | 1.50 |
| 1 | 1:1 | yes | 73% | 1.23 |
| 2 | 3:1 | yes | 77.5% | 1.16 |
| 3 | 1:1 | no | 65% | 1.38 | n/a = not applicable
*based on fresh sorbent feed

We claim:
1. A dry injection process for desulfurizing a flue gas stream with a soda-type dry sorbent, which comprises
(i) injecting a soda-type particulate dry sorbent into a hot flue gas stream containing sulfur dioxide to desulfurize the gas stream said sorbent being substantially all smaller than about 40 mesh sieve;

(ii) collecting the dry sorbent in a bag filter;
(iii) removing the collected dry sorbent from the bag filter;
(iv) recycling a portion of the removed sorbent for reinjection into the flue gas stream;
(v) cooling the recycled sorbent below the bag filter temperature, prior to its reinjection, to a temperature below about 90° C. at which the sodium utilization of the sorbent is enhanced; and
(vi) reinjecting the cooled, recycled sorbent into the hot flue gas stream at a ratio of from about 0.2:1 to 5:1 reinjected sorbent: fresh injected sorbent, based on their respective sodium contents.

2. The process of claim 1 wherein the soda-type sorbent is selected from sodium bicarbonate, Wegscheider's salt, sodium sesquicarbonate, and absorptive soda ash.

3. The process of claim 1 where in the soda-type sorbent has a particle sizing that is substantially all smaller than about 100 mesh sieve.

4. The process of claim 1 wherein the soda-type sorbent has an average particle size that lies between 100 mesh sieve and about 400 mesh sieve.

5. The process of claim 1 wherein the soda-type sorbent has an average particle size that lies between 140 mesh sieve and 325 mesh sieve.

6. The process of claim 1 which further comprises crushing the recycled sorbent prior to its being reinjected into the flue gas stream.

7. The process of claim 1 wherein the sorbent is reinjected at a ratio of from 0.5:1 to 3:1 reinjected sorbent: fresh sorbent, based on their respective sodium contents.

8. The process of claim 1 wherein the bag filter collection period is from about 15 minutes to about 6 hours.

9. The process of claim 1 wherein the temperature of the collected dry sorbent in the bag filter is from about 100° to 250° C.

10. The process of claim 1 wherein the flue gas stream contains not more than 0.4 wt. % $SO_2$.

11. The process of claim 1 wherein the $SO_2$-containing flue gas stream is obtained from the combustion of coal containing not more than about 2 wt. % sulfur.

12. The process of claim 1 wherein sufficient sorbent is injected to remove at least 70% of the sulfur dioxide in the flue gas stream.

13. The process of claim 1 wherein sufficient sorbent is injected to remove at least 90% of the sulfur dioxide in the flue gas stream.

14. The process of claim 1 wherein the recycle ratio is adjusted to provide a utilization of sodium in the dry sorbent of at least 70%.

15. The process of claim 1 wherein the recycle ratio is adjusted to provide a utilization of sodium in the dry sorbent of at least 85%.

16. The process of claim 1 wherein an electrostatic precipitator is employed in lieu of a fabric filter baghouse to collect the dry sorbent.

17. The process of claim 1 wherein the sorbent is sodium sesquicarbonate.

18. The process of claim 1 wherein the recycled sorbent is cooled below a temperature of 70° C.

19. The process of claim 18 wherein the sorbent is trona ore.

20. The process of claim 1 wherein the recycled sorbent is cooled below a temperature of 50° C.

21. The process of claim 1 wherein the recycled, cooled sorbent is allowed to remain at the cooler temperature for at least five minutes before being reinjected into the flue gas stream.

22. The process of claim 1 wherein the collected dry sorbent is cooled in situ in the bag filter, upon completion of the filter cycle but before its removal.

23. The process of claim 1 wherein the portion of removed dry sorbent that is recycled is cooled after its removal from the bag filter, upon completion of the filter cycle.

* * * * *